Patented Nov. 26, 1935

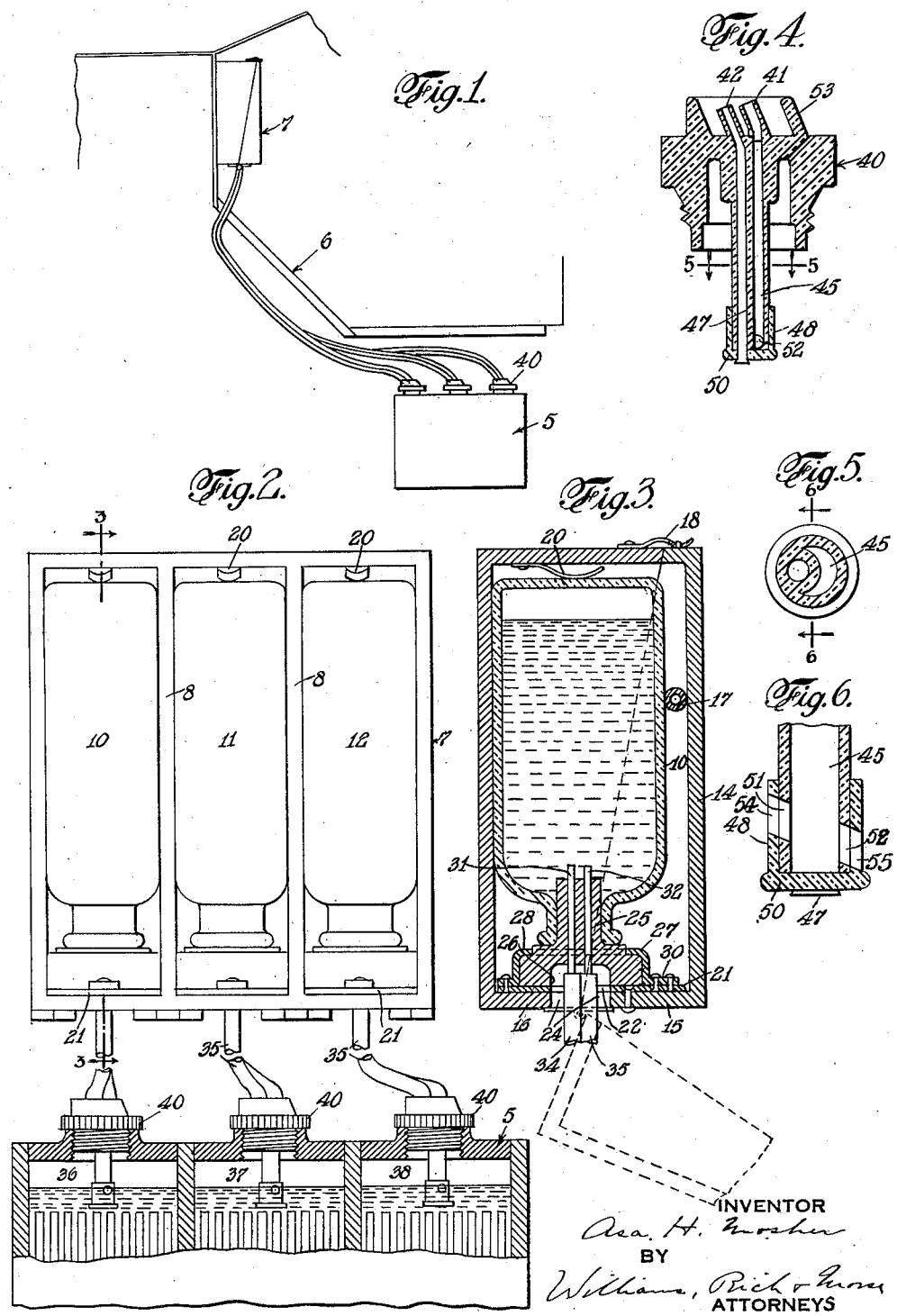

2,022,380

UNITED STATES PATENT OFFICE 2,022,380

BATTERY FILLING DEVICE

Asa H. Mosher, Westfield, N. J.

Application August 7, 1931, Serial No. 555,729

REISSUED

2 Claims. (Cl. 137—68)

This invention relates to battery filling devices for delivering water to storage batteries in such quantities, whenever required, as will maintain the electrolyte between maximum and minimum levels within the battery.

An important object of the invention is to provide a device of the character mentioned which is simple in construction, cheap to manufacture and reliable in operation.
Other objects and advantages of the invention will become apparent from the following description taken in connection with the accompanying drawing, in which—

Fig. 1 is a fragmental view showing the device installed in an automobile and connected to the storage battery thereof;

Fig. 2 is an enlarged view showing, partly in elevation and partly in section, the storage battery, and also showing a reservoir cabinet in which the reservoirs, individual to the battery cells, are supported, the closure for the cabinet removed;

Fig. 3 is a vertical sectional view taken on line 3—3 of Fig. 2, the closure for the cabinet being shown in full lines in its closed position and in broken lines in its open position;

Fig. 4 is an enlarged central vertical sectional view of a battery cap provided with an air conduit and a liquid conduit;
Fig. 5 is a horizontal sectional view taken on line 5—5 of Fig. 4, and Fig. 6 is a vertical sectional view taken on line 6—6 of Fig. 5.

Although the device embodying this invention may be employed in connection with storage batteries, regardless of the specific function that such batteries are to perform, it is herein shown and described in connection with a battery 5 serving as part of the equipment of an automobile, indicated fragmentally by the numeral 6 in Fig. 1.

The device embodying the invention comprises a reservoir cabinet 7 which may be conveniently mounted on the automobile as, for example, beneath the cowl, as shown. This cabinet is divided by partitions 8 into a plurality of compartments, which correspond in number to the number of cells in the battery. These compartments are adapted to snugly receive a plurality of reservoirs 10, 11 and 12 which are preferably square in horizontal section and are held against displacement by a closure 14, the lower wall 15 of which is hinged to the lower wall 16 of the cabinet in such manner that it is permitted, when open, to swing downwardly to an inverted position as shown in dotted lines in Fig. 3. Preferably the closure 14 is provided on its inner wall with a transverse cushioning rod or bar 17 which, when the closure is locked in its closed position by a suitable snap fastener as shown at 18, engages the forward faces of the reservoirs 10, 11 and 12, whereby they are held firmly against the rear wall of the cabinet. If desired, a leaf spring 20 may be connected to the lower face of the top wall of the cabinet in such manner as to engage the upper end of the reservoirs, when they are positioned as shown in Fig. 2, whereby a downward thrust is normally exerted on the same.

To the bottom wall 15 of the closure are connected a plurality of anchor plates 21, one for each compartment of the cabinet 7. Each of these anchor plates is provided centrally with an opening 22 which, when the cabinet is closed, registers with an opening formed intermediate the bottom wall 15 of the closure and the bottom wall 16 of the cabinet by notches 24 which are provided in the meeting margins of these walls. On each anchor plate 21 is mounted a stopper 25, the base portion of which is formed with a recess 26, which registers with the opening 22 in the anchor plate. Each stopper 25 is held in a fixed relation on the anchor plate 21 by a suitable collar 27, which encircles the upper end of the stopper and rests on an annular ledge 28 provided thereon, the collar 27 being provided with a pair of depending angular arms 30 which are suitably connected to the anchor plate.

From the above described stopper-mounting means, it will be understood that the stoppers are carried wholly by and are movable with the closure 14, although such stoppers are in part supported by the lower wall 16 of the cabinet when the closure is in its closed position. It will be further understood that due to the relation of the stoppers to the closure, the reservoirs may be placed in position, without danger of spilling their contents, by first forcing the neck of the respective reservoirs up on the stoppers while the closure is in its inverted position, and by later moving the closure 14, together with the stoppers and their associated reservoirs to closed position, thus bringing the reservoirs into their vertical positions, as shown in Fig. 2, beneath the springs 20.

Projecting through each stopper, are a pair of connector tubes 31 and 32. These tubes communicate with the respective reservoirs and project from the stoppers into the recesses 26 thereof, the projecting ends of such tubes being adapted to receive thereon a pair of flexible tubes 34 and 35 which lead from the respective reservoirs 10,

11 and 12 to the respective cells 36, 37 and 38 of the battery.

With each cell is associated a battery cap 40, which is provided with tubular extensions 41 and 42, the extension 41 being connected to the flexible tube 34 and arranged to communicate with an air tube 45 of relatively large diameter, which is connected to the cap and projects therefrom into the battery cell. The extension 42 is connected to the flexible tube 35 and is arranged to communicate with a liquid tube 47 located within the air tube 45, a part of the wall of the liquid tube being common to a part of the wall of the air tube, as shown in Fig. 5, so that each of these tubes reinforces the other, as will be readily understood. To the lower end of the air tube 45, is connected a cap 48, through the end or baffle wall 50 of which the liquid tube 47 passes. The lower end of the air tube 45 is provided with a vent opening 51 and with a liquid discharge opening 52, both of which register with similar openings 54 and 55 formed in the wall of the cap 48, and the latter of which is located at a point lower than the vent opening 51 for the purpose which will hereinafter more clearly appear. By reason of the presence of the baffle wall 50, of the cap 48 which closes the lower end of the air tube 45, gas bubbles, such as occur during battery charging, are prevented from entering the respective reservoirs by way of the relatively large air tube 45, it being noted that the openings 51 and 52 are disposed substantially out of the path of travel of any rising gas bubbles, and hence do not permit gases to enter the air tube under battery charging conditions. As to the liquid tube 47, it will be noted that, due to its relatively small diameter, such gas as may approach the lower end thereof during battery charging is prevented from entering the same, with the result that such bubbles, in seeking the path of least resistance, will be deflected away from the lower end of such tube and will move upwardly about the air tube 45 in rising to the level of the liquid within the cell.

From the foregoing, it will be appreciated that each of the reservoirs is adapted to communicate with its corresponding battery cell by way of an air conduit and a liquid conduit, the former of which includes the connector tube 31, the flexible tube 34, the tubular extension 41, and the air tube 45, and the latter of which includes the connector tube 32, the flexible tube 35, the tubular extension 42, and the liquid tube 47.

By reason of the fact that the lower ends of the connector tubes 31 and 32 are located within the recess 26 of the stoppers 25, it will be appreciated that these tubes are adequately protected against breakage under all ordinary conditions of use. As to the extensions 41 and 42 of the caps 40, such extensions are similarly protected by guard flanges 53 which surround the same, the guard flanges being preferably formed integral with the respective battery caps.

With the reservoirs 10, 11 and 12 mounted as shown and connected to the respective cells by the hereinbefore described liquid and air conduits, the operation of the device is as follows: As the electrolyte level drops below the air vent 51 in any one of the cells, air enters the air tube 45 through that vent with the result that such liquid as may be present in the air tube as a result of the prior battery filling operation is instantaneously freed and permitted to escape through the liquid discharge opening 52. Due to the sudden release of liquid from the air tube 45, the column of liquid within the air conduit is immediately shortened with respect to the column of liquid within the liquid conduit as measured from the level of the electrolyte within the cell to the level of the water within the reservoir with which such cell communicates. As a result of this quickly established differential, the liquid within the liquid conduit moves downwardly by gravity, creating a partial vacuum in the reservoir corresponding to the cell to be replenished. Due to the partial vacuum, thus created, such liquid as remains in the air conduit following the sudden release of liquid from the air tube 45 by way of the discharge opening 52, is lifted by suction into the reservoir. As soon as complete displacement of liquid within the air conduit has been effected, air is drawn into the reservoir, and as this air bubbles up through the water, thus destroying the partial vacuum, the water within the reservoir is free to flow into its corresponding cell, thus raising the level of the electrolyte. As the level of the electrolyte moves up past the vent opening 51, the flow of liquid from the reservoir generates therein a partial vacuum. As the partial vacuum becomes more and more pronounced, the flow of liquid is gradually decreased and at the same time liquid is sucked from the cell into the air tube 45 and thence into the flexible tube 34 until such time as an equilibrium is established as between the reservoir and its associated conduits, whereupon the flow of liquid from the reservoir is discontinued. This state of equilibrium is maintained until the vent opening 51 is again uncovered by the receding electrolyte, whereupon the filling operation is again carried out as described.

What is claimed is:

1. For use with an electric storage battery cell and a reservoir adapted to contain a liquid to be delivered to said cell: a liquid-level-control device comprising a liquid tube adapted to communicate with said reservoir and with said cell below the minimum liquid level of said cell; and an air tube adapted to communicate with said reservoir independently of said liquid tube; said air tube having a liquid discharge opening through which said air tube is adapted to communicate with said cell and being provided at its side with a vent opening through which said air tube is adapted to communicate with said cell above the minimum liquid level thereof; said vent opening being arranged to serve as a breather for said air tube at the beginning of a battery filling operation, whereby the liquid left within said air tube pursuant to a prior battery filling operation is suddenly released by way of said discharge opening; and said air tube being adapted to serve (upon the release of said liquid therefrom) as a breather for said reservoir, whereby liquid is transferred from said reservoir through said liquid tube to said cell until the level of the electrolyte is raised above the level of communication of said cell with said air tube by way of said vent opening.

2. For use with an electric storage battery cell and a reservoir adapted to contain a liquid to be delivered to said cell: a liquid-level-control device comprising a liquid tube adapted to communicate with said reservoir and with said cell below the minimum liquid level of said cell; an air tube adapted to communicate with said reservoir independently of said liquid tube; and a baffle wall associated with the lower end of said air tube and adapted to serve as a guard against the passage of gas bubbles from the electrolyte into said air tube; said air tube having a liquid discharge opening through which said air tube is adapted to communicate with said cell and being provided at its side with a vent opening through which said air tube is adapted to communicate with said cell above the minimum liquid level thereof; said vent opening being arranged to serve as a breather for said air tube at the beginning of a battery filling operation, whereby the liquid left within said air tube pursuant to a prior battery filling operation is suddenly released by way of said discharge opening; and said air tube being adapted to serve (upon the release of said liquid therefrom) as a breather for said reservoir, whereby liquid is transferred from said reservoir through said liquid tube to said cell until the level of the electrolyte is raised above the level of communication of said cell with said air tube by way of said vent opening.

ASA H. MOSHER.